A. NITTINGER, Jr.

Oscillating Steam Engines.

No. 5,353. Reissued April 15, 1873.

WITNESSES

Edmund P. Cochran

John Gillis

INVENTOR

August Nittinger Jr by Francis D. Pastorius his Atty in fact

AM. PHOTO-LITHOGRAPHIC CO. N.Y. (OSBORNE'S PROCESS)

UNITED STATES PATENT OFFICE.

AUGUST NITTINGER, JR., OF PHILADELPHIA, PENNSYLVANIA.

IMPROVEMENT IN OSCILLATING STEAM-ENGINES.

Specification forming part of Letters Patent No. 106,860, dated August 30, 1870; reissue No. 5,353, dated April 15, 1873; application filed September 27, 1872.

*To all whom it may concern:*

Be it known that I, AUGUST NITTINGER, Jr., of the city and county of Philadelphia and State of Pennsylvania, have invented certain Improvements in Oscillating Steam-Engines, of which the following is a specification:

The following description and annexed drawing fully set forth the nature and object of my invention.

Figure 1:
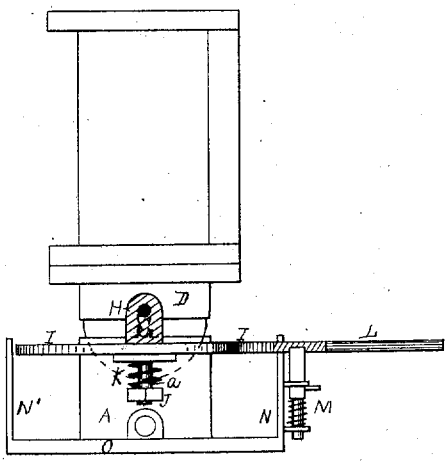
Figure 2:
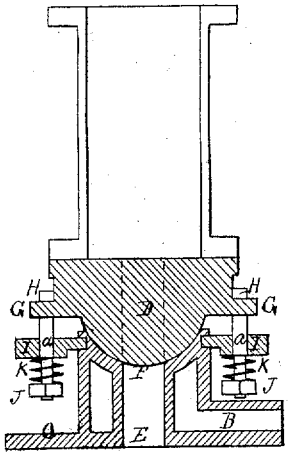
Figure 3:
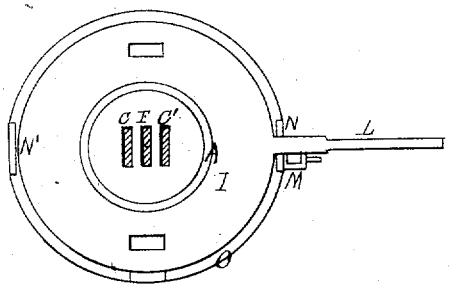
Figure 4:
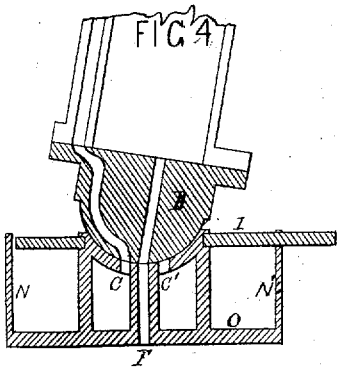

Figure 1 is a side elevation of my improved oscillating steam-engine. Fig. 2 is a vertical section of the same. Fig. 3 is a plan view of the steam-chest, the cylinder being removed. Fig. 4 is a sectional view of the steam-chest and lower part of the cylinder.

In the interior of the cylindrical steam-chest A, which forms the bed of the engine, is an induction-chamber, B, provided with the ports C and C′, and an eduction-chamber, E, with port F. The valve-seat of the steam-chest is made with a rounded concavity, into which is fitted a rounded convexity of the rocking piece D, to which the steam-cylinder is firmly bolted. On opposite sides of the rocking base are the projecting trunnions G, which take into the bearings H, composed of two uprights, the lower ends of which terminate in the bolts *a*, taking through an annular plate, I. J are nuts, and K spiral springs of the same. The plate I encircles the steam-chest A, near its upper end, to allow it to be revolved, and at the same time to carry with it the bearings H of the trunnions. L is a lever-handle of the plate I. It takes into the catch M attached to the upright N of the base O. On the opposite side of the flange or base O is a similar upright, N′, which supports the handle L, when the plate I is turned. It is supplied with a catch similar to that of the upright N. The spiral springs K, which take over the bolts *a*, serve to cushion the effect of the nuts J—that is to say, when the rounded projection D of the cylinder-base takes into the concave valve-seat, and is firmly drawn in place by the nuts, the springs permit the cylinder to yield and to give to any irregularities caused by improper workmanship or from other causes. The spiral springs or their equivalents are therefore broadly claimed, for the purpose shown and described.

When it is desired to reverse the motion of the piston and cause the engine to run in a reverse direction the plate I is turned one-half of a revolution by the handle L in the same manner as an ordinary turn-table, which causes the steam to enter the opposite port and to act on the opposite side of the piston.

I claim as my invention—

1. The construction and arrangement of the bearings H, bolts *a*, nuts J, springs K, and the plate I, substantially as shown and described.

2. In combination with the above, the steam-chest A, base O, uprights N N′, plate I, and the catches M, in the manner and for the purpose herein specified.

In testimony whereof I hereunto sign my name in presence of two subscribing witnesses.

AUGUST NITTINGER, JR.

Witnesses:

SAMUEL NITTINGER,

FRANCIS D. PASTORIUS.